(12) United States Patent
O'Brien et al.

(10) Patent No.: US 10,680,915 B2
(45) Date of Patent: Jun. 9, 2020

(54) CONSUMPTION-BASED LICENSING OF NETWORK FEATURES BASED ON BLOCKCHAIN TRANSACTIONS

(71) Applicant: Cisco Technology, Inc., San Jose, CA (US)

(72) Inventors: Michael P. O'Brien, Manasquan, NJ (US); David C. White, Jr., Saint Petersburg, FL (US); Muhilan Natarajan, Allen, TX (US); Christopher Shaun Roberts, Spring, TX (US)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 15/472,849

(22) Filed: Mar. 29, 2017

(65) Prior Publication Data
US 2018/0287893 A1   Oct. 4, 2018

(51) Int. Cl.
*H04L 12/24* (2006.01)
*H04M 15/00* (2006.01)
*H04W 4/24* (2018.01)
*H04L 12/14* (2006.01)

(52) U.S. Cl.
CPC ...... *H04L 41/5048* (2013.01); *H04L 12/1403* (2013.01); *H04L 12/1407* (2013.01); *H04L 41/5022* (2013.01); *H04M 15/51* (2013.01); *H04M 15/66* (2013.01); *H04W 4/24* (2013.01)

(58) Field of Classification Search
CPC .......... H04L 41/50; H04M 15/66; H04W 4/24
See application file for complete search history.

(56) References Cited

U.S. PATENT DOCUMENTS

| | | | |
|---|---|---|---|
| 2015/0363233 A1* | 12/2015 | Magee | G06F 9/5016 718/104 |
| 2016/0028552 A1 | 1/2016 | Spanos et al. | |
| 2016/0284033 A1* | 9/2016 | Winand | G06Q 50/06 |
| 2016/0321654 A1 | 11/2016 | Lesavich et al. | |
| 2016/0323109 A1 | 11/2016 | McCoy et al. | |
| 2016/0364787 A1 | 12/2016 | Walker et al. | |
| 2017/0005804 A1 | 1/2017 | Zinder | |
| 2017/0034217 A1* | 2/2017 | Anton | H04L 63/20 |
| 2017/0046799 A1* | 2/2017 | Chan | G06Q 20/0655 |

(Continued)

FOREIGN PATENT DOCUMENTS

WO   WO-2018177110 A1 * 10/2018

*Primary Examiner* — Shirley X Zhang
(74) *Attorney, Agent, or Firm* — Edell, Shapiro & Finnan, LLC

(57) ABSTRACT

Consumption-based licensing of network features based on blockchained transactions includes receiving, at a server having connectivity to a network including a plurality of network devices, a request from a particular network device of the plurality of network devices for a feature that is licensed in the network on a per-use basis. Feature-specific key blockchain elements and a feature-specific template are generated for the feature and at least one message that includes the feature-specific key blockchain elements and the feature-specific template is sent to the particular network device. The message enables the plurality of network devices to generate one or more blockchain transactions related to consumption of the feature when a usage interval associated with the feature expires.

20 Claims, 8 Drawing Sheets

(56) References Cited

U.S. PATENT DOCUMENTS

| | | | |
|---|---|---|---|
| 2017/0116693 A1* | 4/2017 | Rae | G06F 21/64 |
| 2018/0025166 A1* | 1/2018 | Daniel | G06Q 10/06 |
| | | | 713/189 |
| 2018/0167198 A1* | 6/2018 | Muller | G06F 21/16 |
| 2018/0189755 A1* | 7/2018 | Kilpatrick | G06Q 20/102 |
| 2018/0374173 A1* | 12/2018 | Chen | G06F 21/10 |

\* cited by examiner

| BC SERVICE NODE#1: ROOT DEVICE CONSUMPTION BC | BC SERVICE NODE#1: CONSUMPTION BC - 1 | BC SERVICE NODE#3: CONSUMPTION BC - 2 |
|---|---|---|
| DEVICE_ID (S/N) | DEVICE_ID (S/N) | DEVICE_ID (S/N) |
| ROOT_NODE_ID | SERVICE_NODE_ID | SERVICE_NODE_ID |
| CUSTOMER_ID | FEATURE_UTILIZATION_MIN | FEATURE_UTILIZATION_MIN |
| FEATURE_ID | FEATURE_UTILIZATION_AVG | FEATURE_UTILIZATION_AVG |
| AUTHORIZATION_TOKEN | FEATURE_UTILIZATION_MAX | FEATURE_UTILIZATION_MAX |
| ROOT_TRANSACTION_HASH | PREVIOUS_HASH | PREVIOUS_HASH |
| TRANSACTION_SIGNATURE | TRANSACTION_HASH | TRANSACTION_HASH |
| TRANSACTION_TIMESTAMP | TRANSACTION_SIGNATURE | TRANSACTION_SIGNATURE |
| | TRANSACTION_TIMESTAMP | TRANSACTION_TIMESTAMP |

502 504 506

PROOF-OF-OWNERSHIP

FIG.5

| BC SERVICE NODE#5: ROOT DEVICE CONSUMPTION BC | BC SERVICE NODE#5: CONSUMPTION BC - 1 | BC SERVICE NODE#7: CONSUMPTION BC - 2 |
|---|---|---|
| DEVICE_ID (S/N) | DEVICE_ID (S/N) | DEVICE_ID (S/N) |
| ROOT_NODE_ID | SERVICE_NODE_ID | SERVICE_NODE_ID |
| CUSTOMER_ID | LICENSEUNITS_USED_MIN | LICENSEUNITS_USED_MIN |
| FEATURE_ID | LICENSEUNITS_USED_AVG | LICENSEUNITS_USED_AVG |
| LICENSE_DURATION | LICENSEUNITS_USED_MAX | LICENSEUNITS_USED_MAX |
| AUTHORIZATION_TOKEN | OTHER_METRICS ••• | OTHER_METRICS ••• |
| ROOT_TRANSACTION_HASH | INTERVAL_START_TIME | INTERVAL_START_TIME |
| TRANSACTION_SIGNATURE | INTERVAL_END_TIME | INTERVAL_END_TIME |
| TRANSACTION_TIMESTAMP | PREVIOUS_HASH | PREVIOUS_HASH |
|  | TRANSACTION_HASH | TRANSACTION_HASH |
|  | TRANSACTION_SIGNATURE | TRANSACTION_SIGNATURE |
|  | TRANSACTION_TIMESTAMP | TRANSACTION_TIMESTAMP |

FIG.6

CONSUMPTION-BASED LICENSING OF NETWORK FEATURES BASED ON BLOCKCHAIN TRANSACTIONS

TECHNICAL FIELD

The present disclosure relates to network services.

BACKGROUND

Service providers often provide their features, such as security and/or Internet Protocol (IP) telephony services, to users based on a licensing system. Licensing systems generally allow a user (i.e., a customer) to use or obtain a certain amount of a feature or service (i.e., a number of IP phones or a time frame of traffic filtering) by purchasing a certain number of licenses (i.e., four licenses equates to four IP phone lines). When a license is time-based, a user may be able to purchase a perpetual license that spans the life of a purchased product or a license that only lasts for a certain time period (i.e., one year). Regardless of how the lifespan of a license is defined, typically, a license is acquired and subsequently assigned to a specific computing device (or a predetermined number of computing devices). The license expires at the end of the predetermined license lifespan and the licensing process is renewed. In enterprise networks that have shifting needs and demands, these inflexible licensing systems are often expensive and inefficient.

BRIEF DESCRIPTION OF THE DRAWINGS

FIG. 5 is a diagram depicting a blockchain data structure that may be utilized by the techniques presented herein, according to an example embodiment.

FIG. 6 is a diagram depicting another blockchain data structure that may be utilized by the techniques presented herein, according to an example embodiment.

DESCRIPTION OF EXAMPLE EMBODIMENTS

Overview

Figure 1:
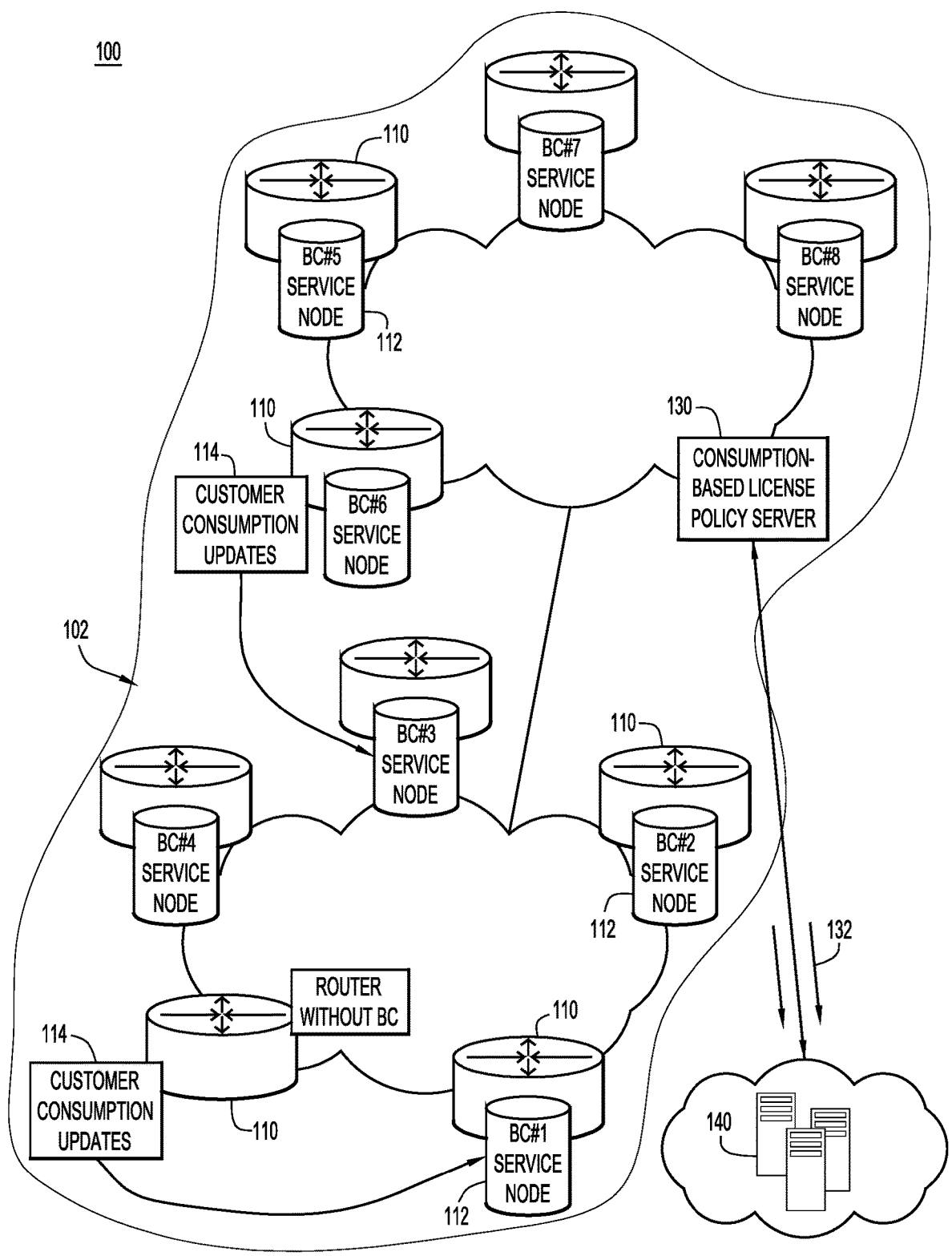
FIG. 1 is a diagram illustrating a networking environment in which the techniques presented herein may be employed, according to an example embodiment.

Techniques are presented herein for consumption-based licensing of network features based on blockchain transactions. These techniques may be embodied as a method, an apparatus, a system, and instructions in a computer-readable storage media to perform the method. According to at least one example embodiment, consumption-based licensing of network features based on blockchain transactions includes receiving, at a server having connectivity to a network including a plurality of network devices, a request from a particular network device of the plurality of network devices for a feature that is licensed in the network on a per-use basis. Feature-specific key blockchain elements and a feature-specific template are generated for the feature and at least one message that includes the feature-specific key blockchain elements and the feature-specific template is sent to the particular network device. The message enables the plurality of network devices to generate one or more blockchain transactions related to consumption of the feature when a usage interval associated with the feature expires.

Example Embodiments

Presented herein are techniques for licensing network features (including services, such as software as a service (SaaS)) with a consumption-based model. The techniques track consumption with feature-specific blockchains. That is, the techniques presented herein provide an implementation of blockchain as a service (BaaS) that securely and flexibly tracks consumption of network features utilized by computing and/or network devices in or associated with a particular network (i.e., an enterprise network). The BaaS implementation is tightly integrated into network devices in a network (i.e., router/switch infrastructure) and utilizes feature-specific key blockchain root elements (i.e., a feature-specific public key) and feature-specific templates to create feature-specific blockchain transactions. The structures of the different feature-specific blockchain transactions are unique and created dynamically, with each feature-specific blockchain being configured to track a set of consumption parameters or metrics (i.e., time-based metrics, usage metering metrics, etc.) that are useful or required for tracking consumption of that particular feature. This allows the BaaS to maintain a secure and complete history of feature consumption for a multitude of features (i.e., a complete and secure blockchain ledger). Moreover, the blockchain structures can be adjusted to track the consumption of a multitude of features with any degree of granularity.

The secure ledger of consumption created by the BaaS allows a license policy server to license network features based on consumption which, in turn, may allow customers to pay for licenses based on consumption. For example, when the techniques presented herein are implemented for a specific customer (i.e., a particular enterprise), the customer can pay for only the services and/or features that they need to use (i.e., pre-pay, but with dynamic terms) or only the services and/or features have already used (i.e., post-pay based on consumption). The license policy server may also dynamically and securely distribute, maintain, authorize, deauthorize, shift, and/or alter licenses based on different parameters (i.e., different time intervals, data usage metrics, etc.). For example, the license policy server may dynamically shift licenses between devices in an enterprise network and/or change the number of licenses (i.e., increase or decrease the number of licenses) provided to an enterprise network, even temporarily, and avoid the tedious operations associated with acquiring, implementing, and renewing licenses on each computing device in an enterprise network.

More generally, the techniques presented herein may provide a detailed accounting of feature consumption, determine right-to-use for various features, and largely support service, feature and/or solution based licensing. Additionally, in some instances, the feature-specific blockchains may also support authentication or validation operations, document control operations, and/or digital identification operations (i.e., for Internet of Things devices). Consequently, the techniques presented herein are well-suited for dynamic and quickly evolving network environments, which are becoming more and more prevalent with advances in network, device, and security technology. For example, the techniques presented herein may support dynamic feature licensing in a bring-your-own-device network environment. Put generally, the techniques provided herein provide new and efficient techniques for delivering network-based services and features to customers.

Reference is first made to FIG. 1 for a description of a network environment 100 in which the techniques presented herein may be employed, according to at least one example embodiment. The network environment 100 includes a network 102 that is formed by a plurality of network devices 110 (i.e., routers and/or switches, an example of which is described in further detail below in connection with FIG. 8). In network 102, two or more of the network devices 110 are or include blockchain service nodes 112 that are configured to perform operations associated with the BaaS implementation presented herein (i.e., generating secure blockchain ledgers). Generally, blockchaining creates an indestructible ledger of time-stamped transactions by utilizing consensus nodes in a distributed architecture to distribute key data structures. The blockchain service nodes 112 may be virtual machines and/or hardware add-on modules configured to enable blockchain services within network 102 by leveraging the natural displacement of network devices 110 throughout the geography of network 102.

Additionally, any of the network devices 110 may be configured to generate, receive, and/or obtain consumption updates 114 for consumption of a particular feature in the network 102. If a network device 110 receives or obtains the consumption updates 114 (i.e., from a computing device), the network device 110 may distribute the consumption updates 114 to another network device 110 that is or includes a blockchain service node 112 to generate a consensus (regardless of whether the network device 110 that receives or obtains the consumption updates 114 is or includes a blockchain service node 112). The consensus may be generated with any desirable consensus protocol or algorithm now known or developed hereafter and in at least some embodiments, a consensus requires agreement between a majority of blockchain service nodes. However, in other embodiments, a consensus may need to be unanimous. Regardless, once a consensus is established, the blockchain service nodes 112 are configured to generate secure, feature-specific blockchain transactions that allow a server 130 in or operatively coupled to network 102 to measure or track consumption of various features provided in the network 102, as is described in further detail below. In other words, the blockchain service nodes 112 may provide blockchain services for a server 130 so that the server 130 can securely track consumption and manage license usage of various features that are licensed on a per-use basis within the network 102. However, the blockchains need not be provided exclusively to the server 130 and may also be distributed to any entities that might benefit from a secure ledger of feature consumption.

Still referring to FIG. 1, the server 130, which may also be referred to as a license policy server 130 (or consumption-based license policy server 130), is operatively coupled to the plurality of network devices 110 and configured to preform flexible license policy control, authorization, and delivery operations. The license policy server 130 is also configured to provision the plurality of network devices 110 with feature specific information that can be used to generate feature-specific blockchain transactions. In particular, the server 130 is configured to send at least one message that includes feature-specific key blockchain root elements (i.e., a feature-specific public key) and a feature-specific template to any of the network devices 110. As is described in further detail below, the server 130 is configured to provide unique key blockchain root elements and template structures for each feature because consumption is often measured with different methods or metrics for different features (i.e., time, quantity, etc.).

The server 130 may also be configured to facilitate consumption-based billing. For example, as indicated at 132, the server 130 may be configured to send consumption data, such as the accumulated feature-specific blockchain transactions (which are generated by the blockchain service nodes 112 based on the information received from the server 130) to server systems 140 associated with a service or feature provider (i.e., server systems 140 associated with an IP telephony service provider). In the depicted example, the server 130 is a central entity in the network 102; however, in other embodiments, the functions of the server 130 may be distributed. For example, the server 130 may include parts or portions that are co-located with the plurality of network devices 110 included in network 102.

Figure 2:
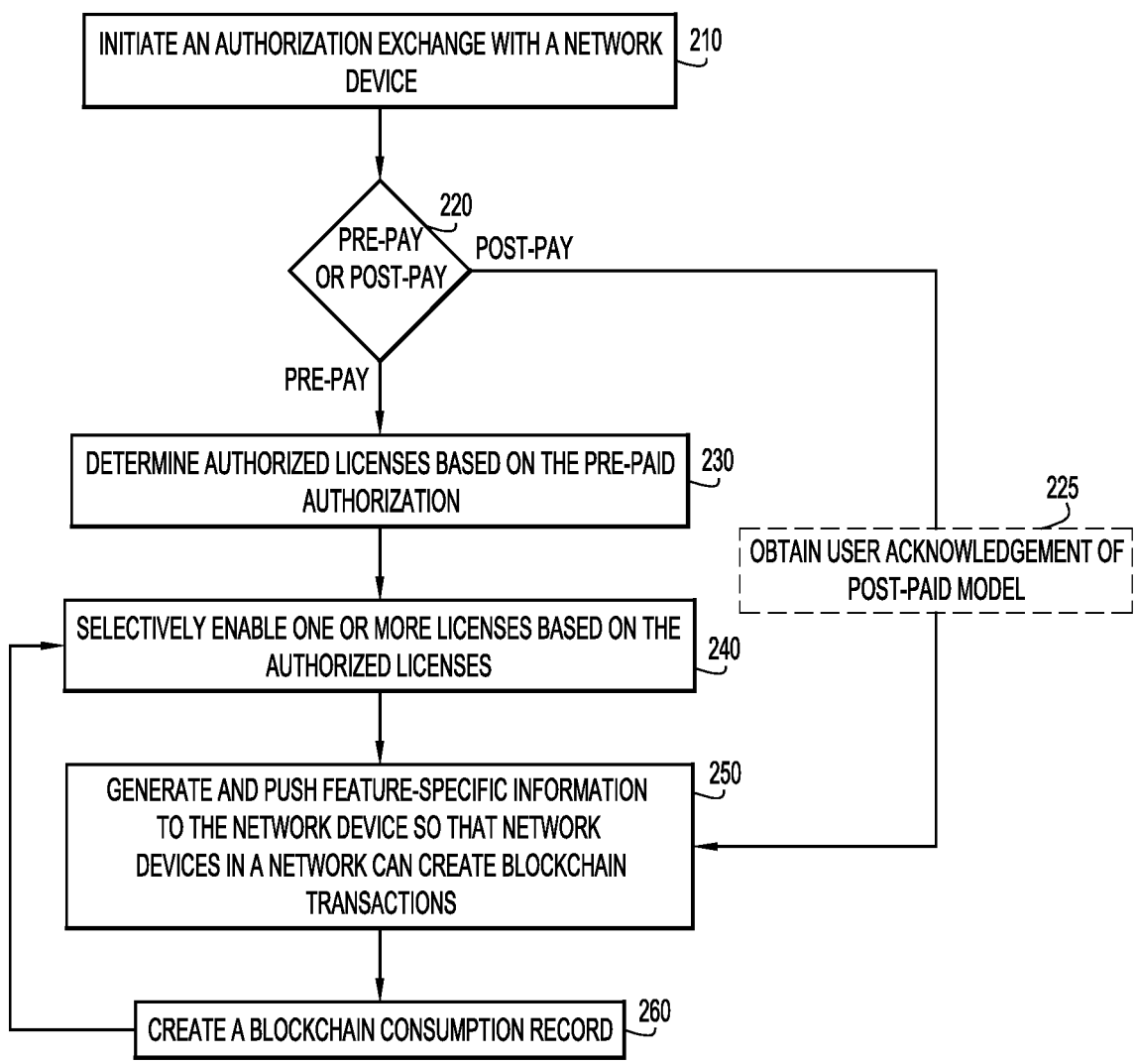
FIG. 2 is a high-level flowchart illustrating a method for consumption-based licensing of network features based on blockchain transactions, according to an example embodiment.

Referring next to FIG. 2 for a description of a high-level flow chart of a method 200 depicting operations performed by a license policy server and a plurality of network devices in a network to generate feature-specific blockchain transactions for consumption-based licensing of network features. Reference is also made to FIG. 1 for the purposes of the description of FIG. 2. Initially, at 210, an authorization exchange occurs between a network device 110 and the license policy server 130 to determine whether the network device 110 is authorized to participate in consumption-based licensing. In some instances, the authorization exchange may be initiated when a customer (i.e., an authorized user for an enterprise network) decides to turn on or activate a feature (i.e., at a network node 110 or a computing device operatively coupled thereto) that is provided in the network on a per-use basis (i.e., a feature that is licensed based on consumption). For example, as devices are on-boarded and basic configurations allow the device to connect to network infrastructure, a "license service" running on a device at boot time (or blockchaining logic stored in the network device) may cause the network device 110 to search for the nearest license policy server 130 to obtain feature authorization. For simplicity, the term feature is repeatedly used in this application to describe the item that is being consumed (and the consumption of which is being tracked); however, it is to be understood that a feature can be a service or a parameter of service (i.e., a specific quality or bandwidth).

In some instances, the license policy server 130 implements an "open licensing agreement" consumption-based model that allows customers to enable any desired or needed feature. Then, the customer is billed after a predetermined time period based on consumption of used features. This model is referred to herein as a post-paid model. Additionally or alternatively, the license policy server 130 may implement a consumption-based licensing model that allows a customer to pre-pay for a specific number of licensing units which can be used as a shared pool of licenses in the network (i.e., the licenses may be dynamically enforced over the entire network 102 based on consumption of devices in the network). This model may be referred to herein as a pre-paid model. At 220, the license policy server 130 determines if the customer has agreed to a pre-paid or post-paid consumption-based licensing model. In other words, the license policy server 130 determines whether the customer has agreed to pay for a certain amount of consumption in advance or agreed to pay for an exact amount of consumption of feature licenses subsequent to consuming the features. In some instances, this determination may be made on a per-feature basis, but in other instances, the determination may be made on a per-customer or per-network basis.

If the customer has agreed to a post-paid consumption-based licensing model, the license policy server 130 may optionally obtain user acknowledgement of the post-paid model, at 225, to ensure that the customer fully understands the model and agrees to pay for their consumption. For example, a message may appear (i.e., pop up) on a command-line interface/command language interpreter (CLI) or network monitoring system (NMS) of the network device 110 involved in the authorization and the message may force the customer to acknowledge and/or agree to the post-paid model. That is, the message may force the customer to acknowledge that costs for the particular feature being requested will be calculated based on usage/consumption. In some instances, the message may even estimate the costs by providing example consumption scenarios.

If, instead, the customer has agreed to a pre-paid consumption-based licensing model, the license policy server 130 determines, at 230, which feature licenses are authorized for the customer. For example, the license policy server 130 may keep track of customer license usage for a particular feature and the number of license units that the customer has used and/or is using for that feature. Based on this determination, the license policy server 130 selectively enables one or more licenses at 240. That is, the license policy server 130 authorizes a particular feature if authorizing the feature will not exceed the pre-paid billing license units purchased by the customer. Then, the license policy server 130 can enable the license on the particular network device 110 requesting the license by initiating a license service process to enforce policy server authorization on the particular network device 110.

If a particular network device 110 is not authorized to use or obtain a license, the license policy server 130 may decline to provide the license on the network device (via the license service process). In these instances, a message may be displayed on the CLI or NMS of the particular network device 110 that explains why the license is being declined. In some instances, the message may also enable the customer to activate the license by switching to a post-paid model. Alternatively, the license policy server may offer some leniency, such as by providing short term extensions, demonstrations, or try-before-buy temporary licenses. Moreover, if a license expires during consumption, the license policy server 130 may provide automatic extension options or a short period of extension to ensure that a customer is not cutoff suddenly, without preparation.

Once a particular network device 110 is authorized to use a particular license, the license policy server 130 generates and pushes, at 250, feature-specific information to the particular network device 110. The feature-specific information may be pushed as the particular feature license is enabled on the particular network device so that the particular network device can utilize the feature and generate feature-specific blockchain transactions that track the consumption of the feature. The information is generated and pushed, at 250, regardless of whether the customer is utilizing a post-paid or pre-paid consumption-based licensing model, and includes feature-specific key blockchain root elements and a feature-specific blockchain template. The information may also include a usage interval to specify when blockchain transactions should be generated (i.e., when usage or consumption updates should be recorded). The template specifies feature-specific parameters that need to be collected to track consumption of a particular feature and, in at least some embodiments, the template includes the usage interval. Example templates are described in further detail below; however, generally, the parameters included in a feature-specific template may vary based on the feature at least because different parameters may be required to track consumption of different features. For example, the usage interval included in a template may be an amount of time (i.e., 30 days), an amount of data (i.e., X terabytes), a number of users, or any other value for a usage/consumption metric.

At 260, a network device 110, and more particularly, a blockchain service node 112, creates a blockchain consumption transaction. In at least some embodiments, the license policy server selects a particular blockchain service node 112 to initiate a feature-specific blockchain and also provides a list of other network devices in the network that are or include blockchain service nodes 112. Then, the network device 110 that initiated the blockchain may distribute consumption data to the blockchain service nodes 112 on the list to generate subsequent blockchain consumption records when the usage interval expires.

Over time, the policy server 130 will continue to selectively authorize feature requests (from the network devices 110 in network 102) by generating and pushing feature-specific information to the appropriate network devices 110 in network 102. Meanwhile, the network devices 110 will continue to generate blockchain transactions that track the consumption of features in the network 102. That is, the network devices 110 will periodically update the blockchain by periodically collecting, formatting, encrypting and delivering feature-specific metadata to a consumption-based blockchain that was initialized for that particular feature. Thus, collectively, the policy server 130 and the network devices 110 may generate a historical record or ledger of feature consumption in the network 102. Since the record/ledger is maintained in blockchain transactions, the record/ledger is secure and timestamped.

Moreover, over time, the policy server 130 may monitor usage of features in the network (including at one or more specific network device) based on the secure blockchain ledger (i.e., based on the one or more blockchain transactions). The policy server 130 may then enforce license policy control for the feature based on the usage and license agreements associated with the network. For a pre-paid model, this involves continually monitoring the blockchain (i.e., every 24 hours) for each licensed feature to ensure that pre-paid feature-specific licenses remain appropriately enabled or disabled (i.e., at 240). For example, the policy server 130 may receive a consumption update for each pre-paid license at the expiration of each feature-specific usage interval. If, based on these updates, the policy server 130 determines that a customer is approaching a pre-paid limit, the policy server 130 may notify the customer that they are approaching their limit and/or that additional licensing units are required to continue using the feature. Additionally or alternatively, the policy server 130 may disable features if the customer has exceed a consumption metric. However, in some instances, automatic extension options, such as switching to a post-paid model, can be offered to the customer to ensure that feature licenses are not disabled without warning, as mentioned above.

By comparison, if a customer is utilizing a post-paid consumption-based licensing model, the license policy server 130 may periodically collect feature-specific consumption records (i.e., every 24 hours) from the feature-specific blockchain and forward these records to server systems 140 of the feature provider. This may allow the feature provider to accurately bill customers based on their consumption. In some instances, the license policy server 130 may also break down the consumption data to show which network features are being consumed by which network devices, the specific costs associated with each network device and/or feature (with various granularity and over different time periods), as requested by the feature provider (i.e., the owner of server systems 140). These kinds of analytics may, in some instances, allow a feature provider to quickly and easily generate a billing report and may also produce analytics relating to how and when a particular enterprise network is utilizing particular network features (and/or which network device(s) in a customer network is/are utilizing particular network features), which may be interesting and useful.

Still further, when a customer is utilizing a post-paid consumption-based licensing model, the customer may also review their usage. In some instances, the customer may set an update interval to control when they receive updates on their usage (i.e., via email, text, or some other form of message). Additionally or alternatively, the customer may be able to view a "live" or running model of their consumption via a dashboard provided on an interactive graphical user interface. Regardless of how the customer receives updates, in the event of a licensing issue (i.e., a license is running low) the customer may be automatically notified (i.e., of a pending shutdown or deactivation of their feature). The policy server 130 may also include an accounting of recent usage (i.e., past 30 days) in the message to allow the customer to make an informed decision with regards to license extension/renewal. If the customer declines an extension/renewal, the license policy will deauthorize the corresponding network device(s) or network feature(s), as discussed above. A customer may subsequently re-enable network device(s) or network feature(s) by agreeing to a post-paid model or purchasing additional license units. However, in at least some embodiments, when a feature is disabled or removed, the corresponding feature-specific blockchain will end. A new feature-specific blockchain will be created to track feature usage when the feature is re-enabled.

Figure 3:
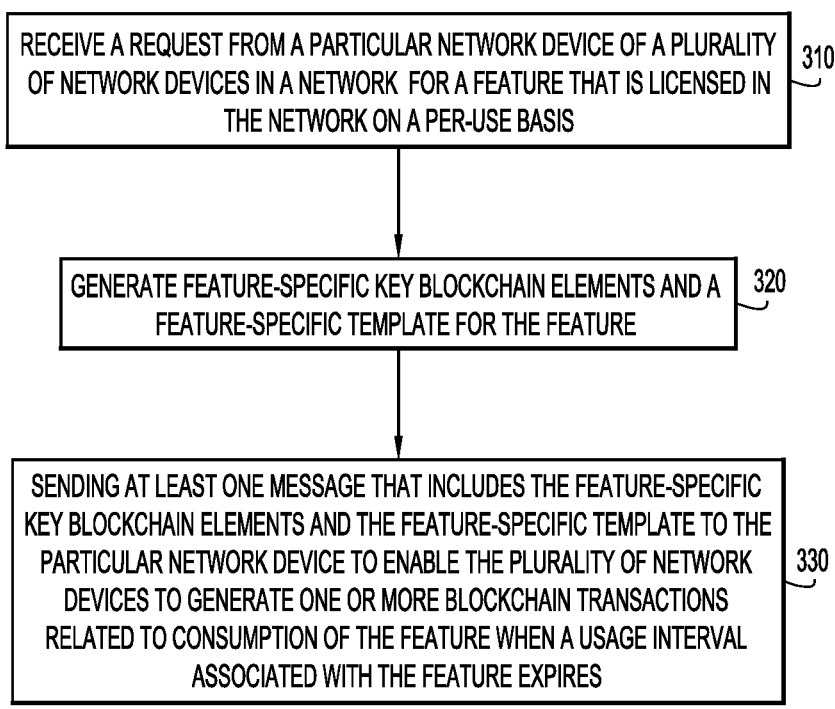
FIG. 3 is a high-level flowchart illustrating a method for consumption-based licensing of network features based on blockchain transactions from the perspective of a license policy server, according to an example embodiment.

Referring next to FIG. 3 for a description of a high-level flow chart of a method 300 depicting operations performed by the license policy server to generate feature-specific blockchain transactions for consumption-based licensing. Initially, at 310, the license policy server receives a request from a particular network device of a plurality of network devices in a network for a feature that is licensed in the network on a per-use basis. For example, as mentioned, when a device is powered on, as part of boot process a license service on the device (or blockchaining logic stored in the network device) finds the nearest license policy server 130 and creates a secure connection therebetween. Then, when a customer wants to enable a feature in the device, the license service will request the feature. Authorization may be exchanged with the license policy server 130 concurrent to or prior to the request to verify that the customer has agreed to a pre-paid or a post-paid consumption-based license model.

At 320, the license policy server generates feature-specific key blockchain root elements and a feature-specific template for the feature. In at least some embodiments, the feature-specific template specifies a usage interval. However, in other embodiments, the template does not specify a usage interval. In these instances, a usage interval may be sent with the feature-specific key blockchain root elements and the feature-specific template for the feature or the network devices may utilize a predetermined usage interval (i.e., 24 hours).

Regardless of whether the template includes a usage interval, the template defines the blockchain data structure for the requested feature. Examples of feature-specific blockchain data structures for two different features are described in detail below in connection with FIGS. 5 and 6. However, generally, a feature-specific blockchain template defines data fields required to create a secure blockchain and data fields of parameters that track consumption of the feature. For example, generally, a blockchain data structure may include a device serial number identifier (ID), a root or service node ID, a customer ID, a feature ID, an authorization token/previous hash, a root transaction hash, a transaction signature, and a transaction timestamp. The device serial number ID (Device_ID) uniquely identifies a specific network device with a predictable hash of a predefined length. The root or service node ID (Service_Node_ID) specifies the blockchain service node that is originating the transaction. The customer ID (Customer_ID) identifies the customer with an identifier of a predetermined length that is specific to the BaaS. The feature ID (Feature_ID) identifies the particular feature designated for consumption tracking in the particular blockchain. The authorization token/previous hash (Authorization_token/Previous_Hash) provides proof-of-ownership for the originating blockchain service node. The transaction hash (Transaction_Hash), transaction signature (Transaction_Signature), and transaction timestamp (Transaction_Timestamp) provide a block hash that identifies a single unique block, a signature hash corresponding to the transaction hash, and a time when transaction was created, respectively.

At 330, the license policy server sends at least one message that includes the feature-specific key blockchain root elements and the feature-specific template to the particular network device to enable the plurality of network devices in the network to generate one or more blockchain transactions related to consumption of the feature when a usage interval expires. More specifically, the license policy server pushes feature-specific key blockchain root elements and the feature-specific blockchain template to the network device from which a request for a feature was received. In at least some instances, the license policy server also provides a list of any blockchain service nodes operating on the network. The list may be populated via a discovery method. Then, the blockchain service node chosen by the license policy server to enable a particular feature can create the root blockchain transaction and initiate a consumption-based licensing model. As the network device consumes this feature over time, future blockchain transactions will be randomly distributed to the blockchain using the list of blockchain service nodes pushed down from the license policy server to the license service operating on the device.

Figure 4:
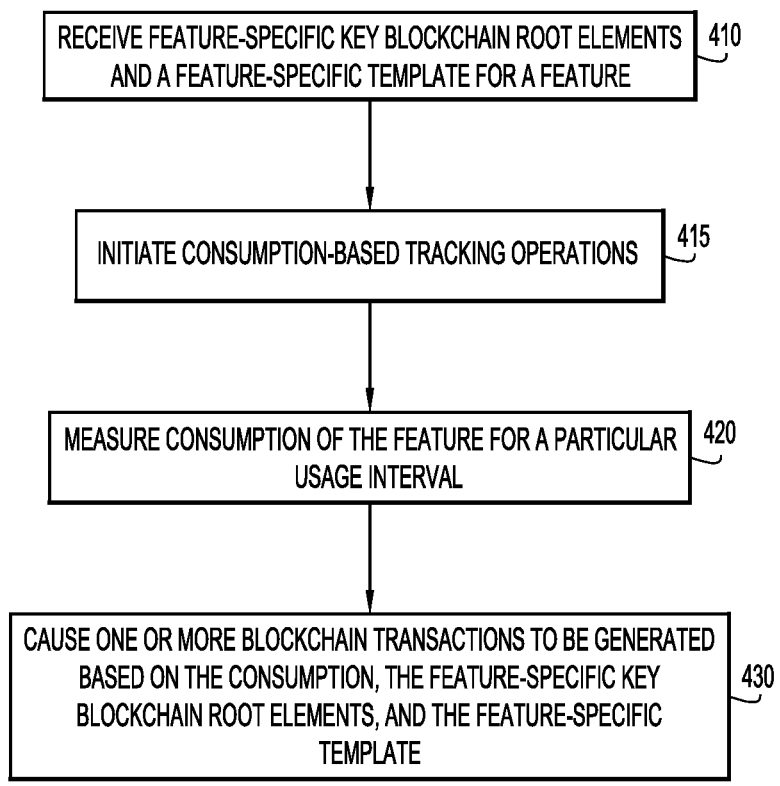
FIG. 4 is a high-level flowchart illustrating a method for consumption-based licensing of network features based on blockchain transactions from the perspective of a network device in the network, according to an example embodiment.

Referring next to FIG. 4 for a description of a high-level flow chart of a method 400 depicting operations performed by a particular network device to generate feature-specific blockchain transactions for consumption-based licensing. Initially, at 410, the network device receives feature-specific key blockchain root elements and a feature-specific template for a feature. For example, a license service running on the network device may securely interact with license policy server to validate new feature requests. In at least some embodiments, the policy server also pushes a list of blockchain service nodes over which blockchain transactions can be randomly distributed. In some instances, the list of blockchain service nodes may be included in the key blockchain root elements and/or the blockchain template, but in other instances, the list may be pushed as a separate piece of information.

After receiving feature-specific key blockchain root elements and a feature-specific template, the network device initiates consumption tracking operations, at 415. In particular, the network device creates a blockchain root transaction (i.e., based on instructions from components and/or logic in the blockchain service node, such as a license service and/or blockchaining logic). The network device selects a particular network device from the plurality of network devices in the network on which to create the blockchain root transaction based on instructions from the policy server. At 420, the network device measures consumption of the feature for a particular interval. In particular, the network device measures the specific parameters specified in the feature-specific template for a usage interval that may also be specified in the feature-specific template. The specific parameters may be measured in accordance with any network analytics operations now known or hereafter developed.

At 430, the network device causes one or more blockchain transaction to be generated based on the consumption, the feature-specific key blockchain root elements, and the feature-specific template. In particular, as the network device uses the feature over time, the network device will selectively distribute consumption data to network devices including a blockchain service node that is included on the list of blockchain service nodes (the list that was provided to the network device by the policy server). The network device distributes consumption data at the expiration of the usage interval (which may be specified in the feature-specific template). As mentioned, the usage interval, as well as parameters included in the consumption data, can vary based on the data needed to measure to consumption of a particular feature and/or based on user needs. Regardless, once the consumption data is distributed, the network device receiving the consumption data creates a consumption record in the blockchain (with other service nodes randomly validating that record to form a consensus that it is indeed valid before the record becomes a part of the official blockchain ledger). Thus, consumption records are created after expiration of the usage interval.

Each network device that is or includes a blockchain service node from the list will use the blockchain process to send periodic updates to a feature-specific blockchain, which will include consumption metadata to help drive the consumption-based blockchain created at initiation (i.e., at step 415). More specifically, a network device will write consumption metadata to the feature-specific consumption blockchain for the feature being tracked. The metadata will be collected, formatted, encrypted and delivered periodically, at the expiration of a usage interval (i.e., every 12 or 24 hours). As has been discussed herein, in at least some instances, the usage interval is defined by the feature-specific template. Regardless, the feature-specific blockchain provides a complete history of the feature usage and consumption over a time interval or set of time intervals.

Now turning to FIGS. 5 and 6 for a description of two example blockchain data structures that can be utilized for two different features. Generally, the blockchain data structures presented herein maintain device feature usage records within a blockchain to maintain accurate consumption records. As has been discussed above, feature-specific consumption records allow the policy server to accurately perform operations (i.e., enforcement, delivery, authorization, deauthorization, etc.) associated with licenses for features that are provided on a per-use basis in a network. However, it is not necessary for the policy server to be the only entity using the blockchain structures and the blockchain structures may also be utilized by any other entities for any other operations that require accurate feature-specific consumption records.

In FIG. 5, diagram 500 illustrates a blockchain data structure for tracking a feature based on network port utilization. Meanwhile, in FIG. 6, diagram 600 illustrates a blockchain data structure used to track a feature based on the number of licenses used. Notably, in each example, a feature-specific blockchain is initiated with a root blockchain transaction (illustrated at 502 and 602, respectively). The root transaction is generated by a network device chosen by the policy server to enable the feature. For example, in at least some instances, a license service running on the network device (or blockchaining logic stored on the device) generates the root transaction when the license policy server provides the feature-specific key blockchain root elements and the feature-specific template in response to an authorized request for the feature. As discussed above, the license policy server also pushes a list of blockchain service nodes to the network device generating the root transaction. Based on this list, the network device chosen by the policy server to enable the feature may selectively distribute future blockchain transactions as the network device consumes the feature over time. Consequently, the example consumption tracking blockchain transactions illustrated at 504, 506, 604, and 606 occur at various blockchain service nodes (service node 1 at 504, service node 3 at 506, service node 5 at 604, and service node 7 at 606).

In the examples depicted in FIGS. 5 and 6, the blockchain structure includes data fields specified in a corresponding feature-specific template. More specifically, each blockchain structure includes the data fields mentioned above in connection with FIG. 3 (i.e., Device_ID, Service_Node_ID (also called Root_Node_ID for the root transaction), Customer_ID, Feature_ID, Authorization_token/Previous_Hash, Transaction_Hash (also called Root_Transaction_Hash for the root transaction), Transaction_Signature, Transaction_Timestamp) and, subsequent to the root transaction, the blockchain also includes feature-specific data fields configured to measure consumption for the specific feature. The feature-specific consumption data fields may be selected or determined based on the customer ID and/or the feature ID.

More specifically, in FIG. 5, the blockchain data structure is configured to measure consumption based on network port utilization. Consequently, any blockchain transactions that are generated subsequent to the root transaction include port utilization statistics for a specific time period (i.e., 24 hours). The port utilization statistics include a minimum utilization for the time period (Feature_Utilization_Min), an average utilization over the time period (Feature_Utilization_Avg), and a maximum utilization during the time period (Feature_Utilization_Max).

By comparison, in FIG. 6, the blockchain data structure is configured to measure consumption based on a number of licenses used. Consequently, any blockchain transactions that are generated subsequent to the root transaction include license unit consumption statistics for a specific time period (i.e., 24 hours) and license duration data. In the example illustrated in FIG. 6, the blockchain data structure includes an additional field in the root transaction illustrated at 602: license duration. This data field allows the blockchain illustrated in FIG. 6 to accurately track consumption based on a number of licenses used. However, this data field (as well as the other data fields) is merely an example and, in other embodiments, the blockchain data structure may include any data fields to enable efficient and accurate measurement of consumption (for any desired consumption tracking method). In the depicted embodiment, the license unit statistics include a minimum utilization for the time period (LicenseUnit_used_Min), an average utilization over the time period (LicenseUnit_used_Avg), and a maximum utilization during the time period (LicenseUnit_used_Max). The license duration data includes a start time of the time period (Interval_Start_time) and an end time of the time period (Interval_End_time).

Figure 7:
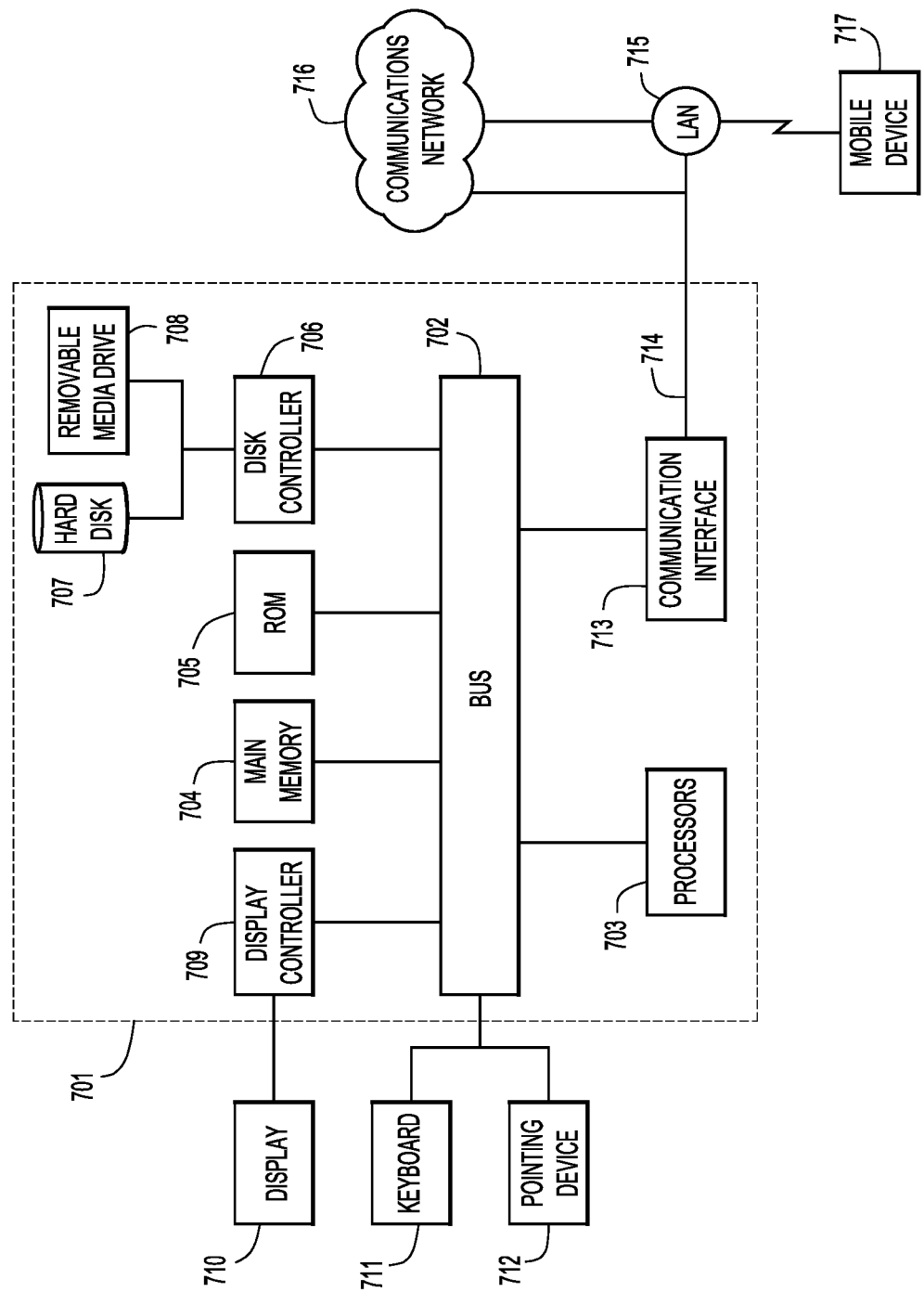
FIG. 7 is a block diagram depicting a computer system configured to execute the techniques presented herein, according to an example embodiment.

Now referring to FIG. 7 for a description of a computer system 701 upon which the server, such as server 130 shown in FIG. 1, and other computing elements presented herein may be implemented. The computer system 701 may be programmed to implement a computer based device, such as a device displaying a user interface, executing one or more physical or virtual service chain elements, such as the service chain elements of FIG. 1. The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (i.e., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (i.e., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (i.e., floppy disk drive, read-only compact disc drive, read/write compact disc drive, tape drive, and removable magneto-optical drive, optical drive). The storage devices may be added to the computer system 701 using an appropriate device interface (i.e., small computer system interface (SCSI), integrated device electronics (IDE), enhanced-IDE (E-IDE), direct memory access (DMA), or ultra-DMA).

The computer system 701 may also include special purpose logic devices (i.e., application specific integrated circuits (ASICs)) or configurable logic devices (i.e., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as liquid crystal display (LCD), or a light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. The pointing device 712 may also be incorporated into the display device as, for example, a capacitive touchscreen and/or a resistive touchscreen.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (i.e., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the invention, and for enabling the computer system 701 to interact with a human user (i.e., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (i.e., a LAN) or through equipment operated by a service provider, which provides communication services through a communications network 716. The local network 714 and the communications network 716 use, for example, electrical, electromagnetic, or optical signals that carry digital data streams, and the associated physical layer (i.e., CAT 5 cable, coaxial cable, optical fiber, etc.). The signals through the various networks and the signals on the network link 714 and through the communication interface 713, which carry the digital data to and from the computer system 701 maybe implemented in baseband signals, or carrier wave based signals. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

Figure 8:
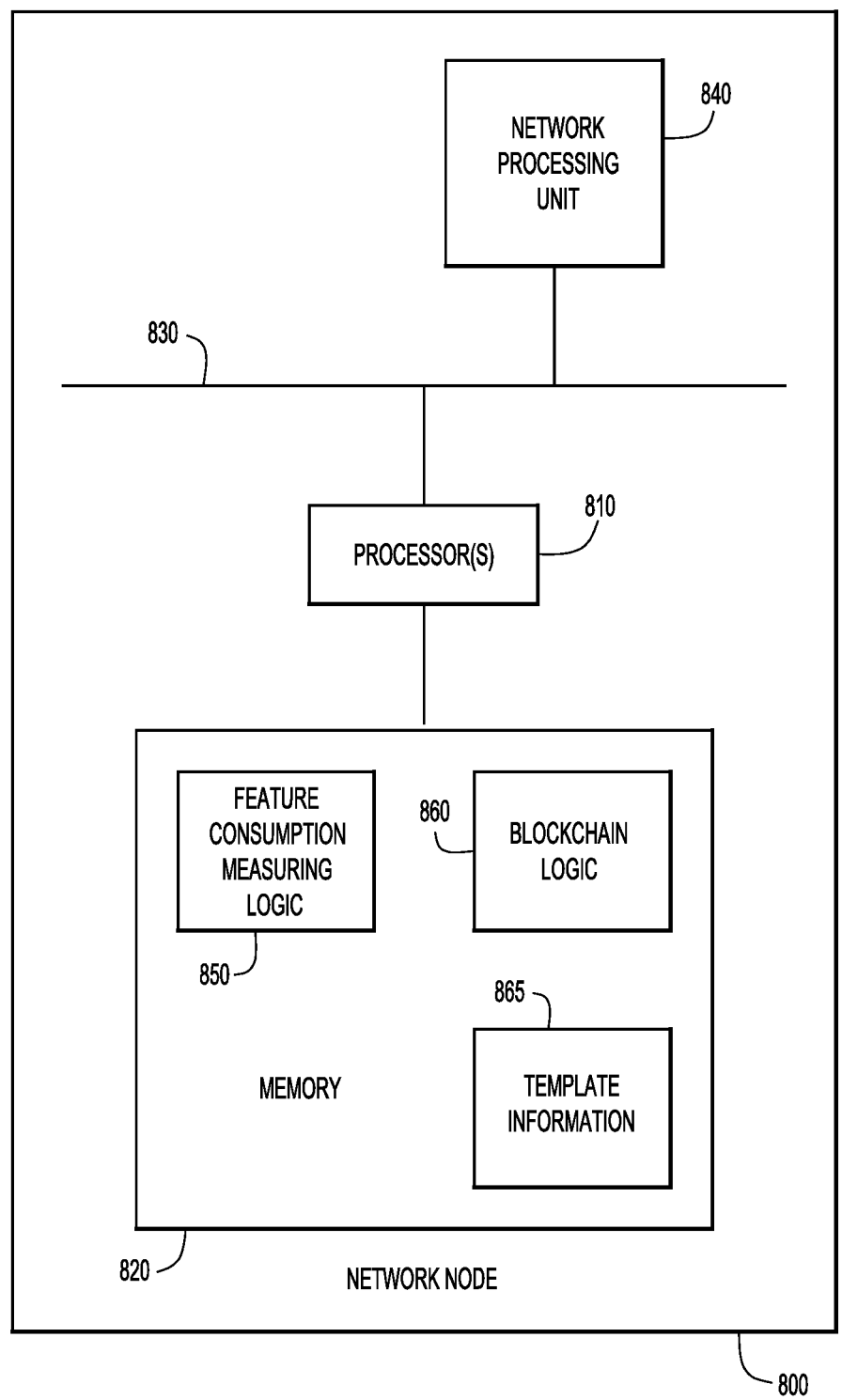
FIG. 8 is a block diagram of a network device configured to participate in the techniques presented herein, according to an example embodiment.

Now referring to FIG. 8, an example block diagram is shown of a network device or network node 800, such as any of the network devices 110 shown in FIG. 1, configured to participate in the techniques presented herein. The network device 800 includes one or more processors 810, memory 820, a bus 830 and a network processor unit 840. The processor 810 may be a microprocessor or microcontroller. The network processor unit 840 may include one or more ASICs and facilitates network communications between the network device 800 and other network nodes as well as the server 130, and includes a plurality of network ports (not shown) from which to receive packets in a network and to which it routes packets into the network. The processor 810 executes instructions associated with software stored in memory 820.

Specifically, the memory 820 stores instructions for feature consumption measuring logic 850 that, when executed by the processor 810, cause the network device to track consumption of particular features being utilized at the network device 110. The memory 820 also stores blockchaining logic 860 (also referred to herein as blockchain license service or, more simply, a license service) that, when executed by the processor 810, cause the network device to, based on template information 865 received (or fetched) from the license policy server, generate or initiate generation of a blockchain transaction, according to the operations described herein. It should be noted that in some embodiments, the consumption measuring logic 850 and/or the header blockchaining logic 860 may be implemented in the form of firmware that is processed by ASICs, which may be integrated into a circuit board. Alternatively, the consumption measuring logic 850 and/or the header blockchaining logic 860 may be in the form of one or more logic blocks included in a programmable logic device (i.e., a field-programmable gate array).

The memory 820 may include ROM, RAM, magnetic disk storage media devices, tamper-proof storage, optical storage media devices, flash memory devices, electrical, optical, or other physical/tangible memory storage devices. In general, the memory 820 may comprise one or more tangible (non-transitory) computer readable storage media (i.e., a memory device) encoded with software comprising computer executable instructions and when the software is executed (by the processor 810) it is operable to perform the operations described herein.

To summarize, in one form, a method is provided comprising: at a server having connectivity to a network including a plurality of network devices, receiving a request from a particular network device of the plurality of network devices for a feature that is licensed in the network on a per-use basis; generating feature-specific key blockchain elements and a feature-specific template for the feature; sending at least one message that includes the feature-specific key blockchain elements and the feature-specific template to the particular network device to enable the plurality of network devices to generate one or more blockchain transactions related to consumption of the feature when a usage interval associated with the feature expires.

In another form, a system is provided comprising: a network including a plurality of network devices, wherein each of the plurality of network devices is configured to: request features that are licensed in the network on a per-use basis; and a policy server configured including a processor configured to: generate feature-specific key blockchain elements and a feature-specific template for each of the features; and send at least one message that includes particular feature-specific key blockchain elements and a particular feature-specific template to a particular network device requesting a particular feature to enable the plurality of network devices to generate one or more blockchain transactions related to consumption of the particular feature when a usage interval associated with the particular feature expires.

In yet another form, one or more non-transitory computer-readable storage media is provided encoded with software comprising computer executable instructions and when the software is executed operable to: receive, from a particular network device in a network including a plurality of network devices, a request for a feature that is licensed in the network on a per-use basis; generate feature-specific key blockchain elements and a feature-specific template for the feature; send at least one message that includes the feature-specific key blockchain elements and the feature-specific template to the particular network device to enable the plurality of network devices to generate one or more blockchain transactions related to consumption of the feature when a usage interval associated with the feature expires.

In still another form, an apparatus is provided comprising a communication interface configured to enable network communications in a network including a plurality of network devices; and a processor coupled to the communication interface, wherein the processor is configured to: receive via the communication interface a request from a particular network device of the plurality of network devices for a feature that is licensed in the network on a per-use basis; generate feature-specific key blockchain elements and a feature-specific template for the feature; and cause to be sent via the network interface at least one message that includes the feature-specific key blockchain elements and the feature-specific template to the particular network device to enable the plurality of network devices to generate one or more blockchain transactions related to consumption of the feature when a usage interval associated with the feature expires.

A number of advantages are achieved via the methods, system, device(s) and computer readable media described herein. As one notable example, the techniques presented herein provide a flexible and dynamic feature licensing that allows an enterprise network to quickly alter or shift their license structure. Moreover, the secure ledger created by the blockchained transactions provides an opportunity to license features (including services or service parameters) with a pay-as-you-go structure. From a network provider standpoint, the techniques provided herein may create new revenue streams (since customers can quickly access short term licenses where they might have found a way to work without the feature if the feature required a typical licenses). Moreover, advantageously, the techniques provided herein may also be leveraged to provide digital identity services for Internet of Things devices, secure document control, supply chain validation, certification and many other uses.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
   at a server having connectivity to a network including a plurality of network devices, receiving a request from a particular network device of the plurality of network devices for a feature that is licensed in the network on a per-use basis, wherein the feature comprises a particular software-as-a-service (SaaS);
   generating, by the server, feature-specific key blockchain elements and a feature-specific template for the feature, wherein the feature-specific template comprises a feature identifier specifying the feature for consumption tracking and a usage interval associated with the feature; and
   sending, by the server, at least one message that includes the feature-specific key blockchain elements and the feature-specific template to the particular network device to cause the plurality of network devices to generate one or more blockchain transactions for a blockchain related to consumption of the feature in response to the usage interval associated with the feature expiring, wherein the at least one message is sent by the server to the particular network device without recording the at least one message in the blockchain.

2. The method of claim 1, wherein the usage interval is included in the feature-specific template.

3. The method of claim 1, further comprising:
   authorizing the particular network device to utilize the feature prior to the generating.

4. The method of claim 3, wherein the authorizing further comprises at least one of:
   determining that the particular network device is associated with a pre-paid license agreement for the feature; and
   determining that the particular network device is associated with an agreement to pay for licenses of the feature subsequent to the consumption of the feature.

5. The method of claim 1, wherein the feature is a service or a parameter of a service.

6. The method of claim 1, wherein the usage interval specifies a length of time or a value for a consumption metric.

7. The method of claim 1, further comprising:
   monitoring usage of the feature at the particular network device based on the one or more blockchain transactions; and
   enforcing license policy control for the feature based on the usage and license agreements associated with the network.

8. The method of claim 1, wherein two or more of the plurality of network devices comprise blockchain service nodes configured to provide a decentralized consensus for the one or more blockchain transactions created by the plurality of network devices.

9. A system comprising:
   a network including a plurality of network devices, wherein each of the plurality of network devices is configured to:
      request features that are licensed in the network on a per-use basis, wherein each feature comprises a particular software-as-a-service (SaaS); and
   a policy server including a processor configured to:
      generate, by the policy server, feature-specific key blockchain elements and a feature-specific template for each of the features, wherein the feature-specific template comprises a feature identifier specifying the feature for consumption tracking and a usage interval associated with the feature; and
      send, by the policy server, at least one message to a particular network device of the plurality of network devices requesting a particular feature, the at least one message including particular feature-specific key blockchain elements and a particular feature-specific template that cause the plurality of network devices to generate one or more blockchain transactions for a blockchain related to consumption of the particular feature in response to the usage interval associated with the particular feature expiring, wherein the at least one message is sent by the policy server to the particular network device without recording the at least one message in the blockchain.

10. The system of claim 9, wherein the usage interval is included in the feature-specific template.

11. The system of claim 9, wherein the processor of the policy server is further configured to:
   authorize the particular network device to utilize the particular feature by at least one of:
      determining that the particular network device is associated with a pre-paid license agreement for the particular feature; and
      determining that the particular network device is associated with an agreement to pay for licenses of the particular feature subsequent to the consumption of the particular feature.

12. The system of claim 9, wherein the particular feature is a service or a parameter of a service and the usage interval specifies a length of time or a value for a consumption metric.

13. The system of claim 9, wherein the processor of the policy server is further configured to:
  monitor usage of the particular feature at the particular network device based on the one or more blockchain transactions; and
  enforce license policy control for the particular feature based on the usage and license agreements associated with the network.

14. The system of claim 9, wherein two or more of the plurality of network devices comprise blockchain service nodes configured to provide a decentralized consensus for the one or more blockchain transactions created by the plurality of network devices.

15. One or more non-transitory computer readable storage media encoded with software comprising computer executable instructions and when the software is executed operable to:
  receive, from a particular network device in a network including a plurality of network devices, a request for a feature that is licensed in the network on a per-use basis, wherein the feature comprises a particular software-as-a-service (SaaS);
  generate feature-specific key blockchain elements and a feature-specific template for the feature, wherein the feature-specific template comprises a feature identifier specifying the feature for consumption tracking and a usage interval associated with the feature; and
  send at least one message that includes the feature-specific key blockchain elements and the feature-specific template to the particular network device to cause the plurality of network devices to generate one or more blockchain transactions for a blockchain related to consumption of the feature in response to the usage interval associated with the feature expiring, wherein the at least one message is sent to the particular network device without recording the at least one message in the blockchain.

16. The one or more non-transitory computer readable storage media of claim 15, wherein the usage interval is included in the feature-specific template.

17. The one or more non-transitory computer readable storage media of claim 15, further comprising instructions operable to:
  authorize the particular network device to utilize the feature by at least one of:
    determining that the particular network device is associated with a pre-paid license agreement for the feature; and
    determining that the particular network device is associated with an agreement to pay for licenses of the feature subsequent to the consumption of the feature.

18. The one or more non-transitory computer readable storage media of claim 15, wherein the feature is a service or a parameter of a service and the usage interval specifies a length of time or a value for a consumption metric.

19. The one or more non-transitory computer readable storage media of claim 15, further comprising instructions operable to:
  monitor usage of the feature at the particular network device based on the one or more blockchain transactions; and
  enforce license policy control for the feature based on the usage and license agreements associated with the network.

20. The one or more non-transitory computer readable storage media of claim 15, wherein two or more of the plurality of network devices comprise blockchain service nodes configured to provide a decentralized consensus for the one or more blockchain transactions created by the plurality of network devices.

* * * * *